(12) United States Patent
Asano

(10) Patent No.: US 8,577,160 B2
(45) Date of Patent: Nov. 5, 2013

(54) APPARATUS FOR CODING OR DECODING AN IMAGE BY EXECUTING VARIABLE-LENGTH CODING/DECODING AND FIXED-LENGTH CODING/DECODING

(75) Inventor: Wataru Asano, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/418,695

(22) Filed: Mar. 13, 2012

(65) Prior Publication Data

US 2012/0328206 A1    Dec. 27, 2012

(30) Foreign Application Priority Data

Jun. 27, 2011   (JP) ................... 2011-142210

(51) Int. Cl.
*G06K 9/36* (2006.01)
*G06K 9/46* (2006.01)

(52) U.S. Cl.
USPC ........................................... 382/233

(58) Field of Classification Search
USPC ......... 382/173, 190, 232, 233, 246, 250, 251; 358/261.1, 426, 427, 433; 375/240.01, 375/240.03, 240.08, 240.1, 240.11, 240.18; 341/65, 67, 69, 82, 106; 348/390.1; 711/108, E12.001
See application file for complete search history.

(56) References Cited

U.S. PATENT DOCUMENTS

| | | | | |
|---|---|---|---|---|
| 5,469,273 A | * | 11/1995 | Demura | 382/244 |
| 5,699,117 A | * | 12/1997 | Uramoto et al. | 348/390.1 |
| 6,490,372 B1 | * | 12/2002 | Boon | 382/233 |
| 7,778,477 B2 | * | 8/2010 | Lee et al. | 382/246 |
| 2002/0006228 A1 | * | 1/2002 | Suzuki et al. | 382/233 |
| 2012/0328206 A1 | * | 12/2012 | Asano | 382/233 |
| 2013/0054886 A1 | * | 2/2013 | Eshraghian et al. | 711/108 |

FOREIGN PATENT DOCUMENTS

JP   2009-253471   10/2009

OTHER PUBLICATIONS

Jerome M. Shapiro, "Embedded Image Coding Using Zerotrees of Wavelet Coefficients", IEEE Transactions on Signal Processing, vol. 41, No. 12, Dec. 1993, pp. 3445-3462.

* cited by examiner

*Primary Examiner* — Amir Alavi
(74) *Attorney, Agent, or Firm* — Oblon, Spivak, McClelland, Maier & Neustadt, L.L.P.

(57) ABSTRACT

In an image coding apparatus, a transformation unit acquires a transformation coefficient by executing frequency transformation to an image. An extraction unit extracts a plurality of bits each from the transformation coefficient. A coding unit executes variable-length coding to the plurality of bits including a most significant bit, and executes fixed-length coding to the plurality of bits including a least significant bit. In an image decoding apparatus, an extraction unit extracts a plurality of bits from a code string. A decoding unit executes variable-length decoding to the plurality of bits including a most significant bit, and executes fixed-length decoding to the plurality of bits including a least significant bit. A connection unit acquires a transformation coefficient by connecting the plurality of bits each decoded. An inverse transformation unit generates the image by executing frequency-inverse transformation to the transformation coefficient.

7 Claims, 6 Drawing Sheets

| TRANSFORMATION COEFFICIENT | 64 | −11 | 22 | 38 | −29 | 156 |
|---|---|---|---|---|---|---|
| MSB  7 | 0 | 0 | 0 | 0 | 0 | 1 |
| 6 | 1 | 0 | 0 | 0 | 0 | 0 |
| 5 | 0 | 0 | 0 | 1 | 0 | 0 |
| 4 | 0 | 0 | 1 | 0 | 1 | 1 |
| 3 | 0 | 1 | 0 | 0 | 1 | 1 |
| 2 | 0 | 0 | 1 | 1 | 1 | 1 |
| 1 | 0 | 1 | 1 | 1 | 0 | 0 |
| LSB  0 | 0 | 1 | 0 | 0 | 1 | 0 |
| SIGN | + | − | + | + | − | + |

FIG. 3

APPARATUS FOR CODING OR DECODING AN IMAGE BY EXECUTING VARIABLE-LENGTH CODING/DECODING AND FIXED-LENGTH CODING/DECODING

CROSS-REFERENCE TO RELATED APPLICATION

This application is based upon and claims the benefit of priority from Japanese Patent Application No. 2011-142210, filed on Jun. 27, 2011; the entire contents of which are incorporated herein by reference.

FIELD

Embodiments described herein relate generally to an image coding apparatus, a method and a non-transitory computer readable medium thereof, and an image decoding apparatus, a method and a non-transitory computer readable medium thereof.

BACKGROUND

As a (SNR scalable) method for coding an image according to conventional technique, transformation coefficients (acquired by executing frequency transformation to the image) are divided into each bit plane of one bit, and each bit plane is subjected to arithmetic coding. However, in this method, processing load thereof becomes high because the arithmetic coding is executed to each bit plane.

Furthermore, as another method for coding an image according to conventional technique, transformation coefficients (acquired by executing frequency transformation to the image) are divided into a high-order bit and a low-order bit. The high-order bit is coded without coding the low-order bit. However, in this method, coding efficiency is low because the high-order bit of the transformation coefficients is only coded.

BRIEF DESCRIPTION OF THE DRAWINGS

FIG. 3 is a flow chart of processing of the image coding apparatus 1 according to a modification of the first embodiment.

DETAILED DESCRIPTION

According to one embodiment, an image coding apparatus includes a transformation unit, an extraction unit, and a coding unit. The transformation unit is configured to acquire a transformation coefficient by executing frequency transformation to the image. The extraction unit is configured to extract a plurality of bits from the transformation coefficient. The coding unit is configured to execute variable-length coding to the plurality of bits including a most significant bit, and to execute fixed-length coding to the plurality of bits including a least significant bit.

According to another embodiment, an image decoding apparatus includes an extraction unit, a decoding unit, a connection unit, and an inverse transformation unit. The extraction unit is configured to extract a plurality of bits each from a code string acquired. The decoding unit is configured to execute variable-length decoding to the plurality of bits including a most significant bit, and to execute fixed-length decoding to the plurality of bits including a least significant bit. The connection unit is configured to acquire a transformation coefficient by connecting the plurality of bits each decoded. The inverse transformation unit is configured to generate the image by executing frequency-inverse transformation to the transformation coefficient.

Various embodiments will be described hereinafter with reference to the accompanying drawings.

(The First Embodiment)

As to an image coding apparatus 1 of the first embodiment, a code string is generated by coding an input image. For example, the image coding apparatus 1 is suitable for image transmission in thin client system.

The image coding apparatus 1 executes frequency transformation to the image, and acquires a transformation coefficient of N bits for each component. As to each transformation coefficient of N bits, the image coding apparatus 1 extracts a plurality of bits in order from a high-order bit. If the plurality of bits (extracted) is positioned higher than a predetermined bit position (T-th bit), the image coding apparatus 1 executes variable-length coding to the plurality of bits. On the other hand, if the plurality of bits (extracted) is positioned lower than the predetermined bit position (T-th bit), the image coding apparatus 1 executes fixed-length coding to the plurality of bits. As a result, the image coding apparatus 1 generates a code string coded from the input image.

Figure 1:
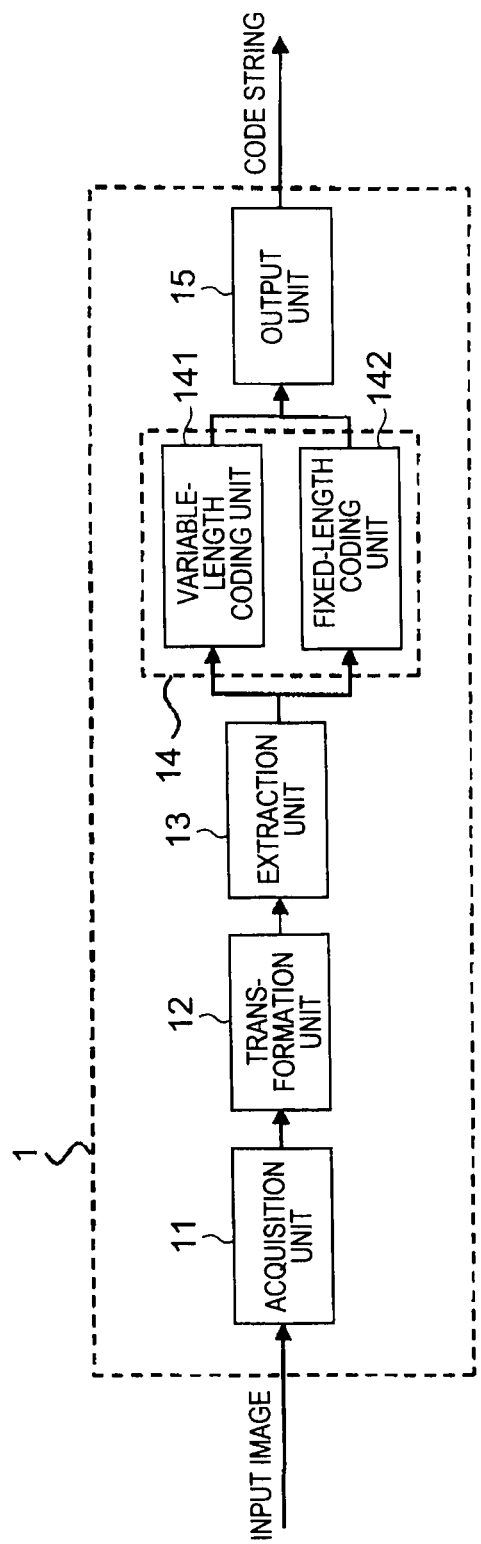
FIG. 1 is a block diagram of an image coding apparatus 1 according to the first embodiment.

FIG. 1 is a block diagram of the image coding apparatus 1. The image coding apparatus 1 includes an acquisition unit 11, a transformation unit 12, an extraction unit 13, a coding unit 14, and an output unit 15. The coding unit 14 includes a variable-length coding unit 141 and a fixed-length coding unit 142.

The acquisition unit 11 acquires an input image. The input image may be a frame image in video, or a still image.

The transformation unit 12 executes frequency transformation to the input image, and acquires a transformation coefficient of N bits for each component. Here, the frequency transformation may be an orthogonal transform such as Discrete wavelet transform (DWT) or Discrete cosine transform (DCT).

As to each transformation coefficient of N bits, the extraction unit 13 extracts a plurality of bits in order from a most significant bit (MSB). If the plurality of bits (extracted) is positioned higher than a predetermined bit position (T-th bit), the extraction unit 13 supplies the plurality of bits to the variable-length coding unit 141. On the other hand, if the plurality of bits (extracted) is positioned lower than the predetermined bit position (T-th bit), the extraction unit 13 supplies the plurality of bits to the fixed-length coding unit 142.

The variable-length coding unit 141 codes the plurality of bits with variable-length, and generates a first code string for the plurality of bits. The fixed-length coding unit 142 codes the plurality of bits with fixed-length, and generates a second code string for the plurality of bits.

The output unit 15 outputs a code string by connecting the first code string with the second code string.

The acquisition unit 11, the transformation unit 12, the extraction unit 13, the coding unit 14 and the output unit 1, may be realized by a central processing unit (CPU) and a memory used thereby.

Figure 2:
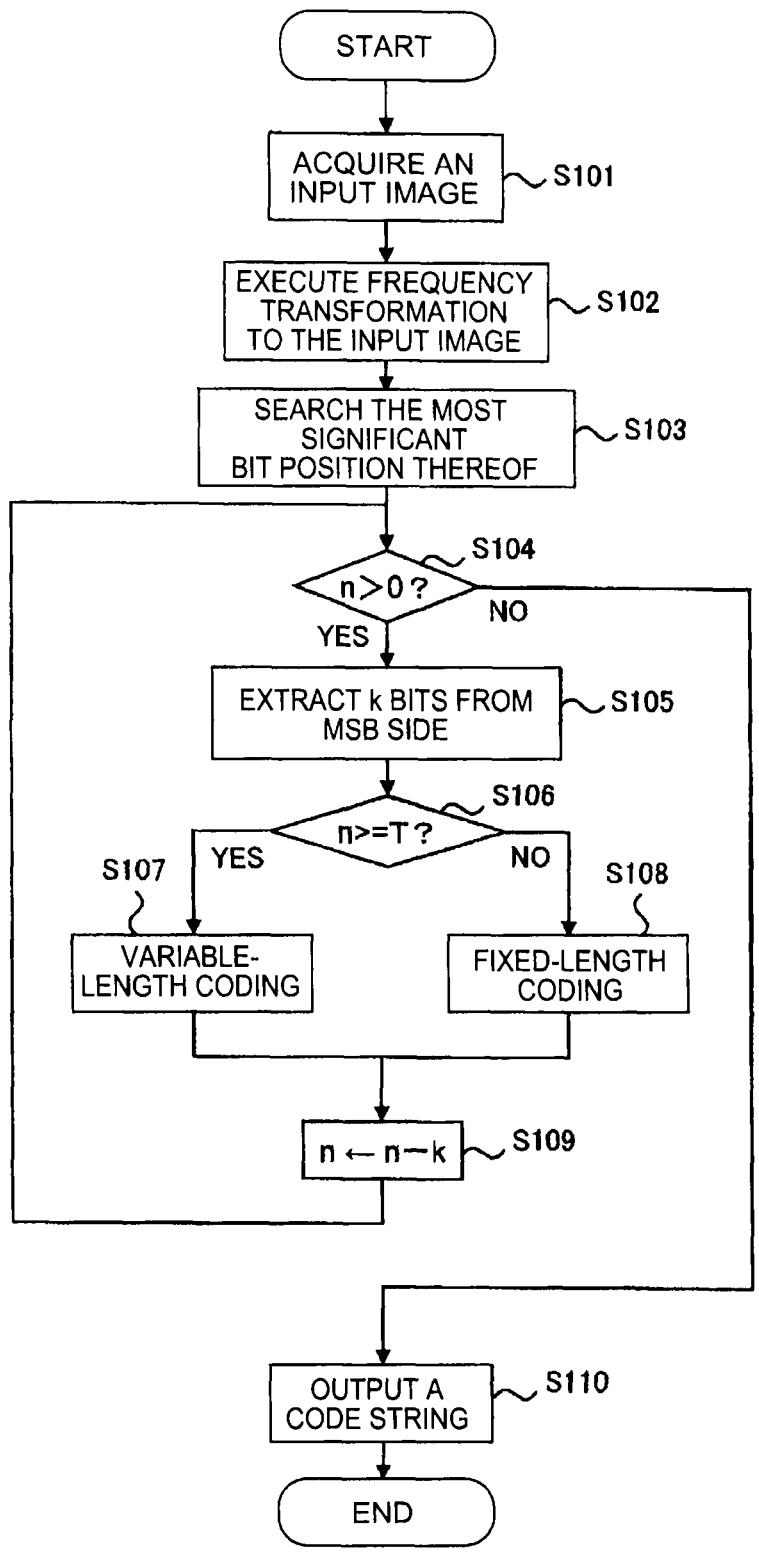
FIG. 2 is a flow chart of processing of the image coding apparatus 1.

FIG. 2 is a flow chart of processing of the image coding apparatus 1. The acquisition unit 11 acquires an input image (S101). The acquisition unit 1 supplies the input image to the transformation unit 12. The transformation unit 12 executes frequency transformation to the input image, and acquires a transformation coefficient of N bits for each pixel (S102).

FIG. 3 shows one example of the transformation coefficient. Exemplarily, a transformation coefficient "+64" is represented as a bit string "01000000" (sign:+) from the most significant bit. The transformation unit 12 supplies the transformation coefficient to the extraction unit 13.

The extraction unit 13 searches a bit position "n" (Initially, n=N) of MSB of present transformation coefficient (S103). Moreover, the extraction unit 13 had better store the transformation coefficient into a storage unit (not shown in FIG). The extraction unit 13 decides whether at least one bit is not coded yet (S104). Briefly, the extraction unit 13 decides whether a bit position "n" of MSB of present transformation coefficient is larger than "0".

If the bit position "n" of MSB of present transformation coefficient is larger than "0" (Yes at S104), the extraction unit 13 extracts k bits (k is an integral number larger than "1") from MSB of the transformation coefficient (S105).

The extraction unit 13 decides whether k bits (extracted) is positioned higher than T-th bit (S106). If the k bits is positioned higher than the T-th bit (Yes at S104), the extraction unit 13 supplies the k bits to the variable-length coding unit 141. The variable-length coding unit 141 codes the k bits with variable-length, and generates a first code string (S107). Exemplarily, the variable-length coding may be Huffman coding or run-length coding. If the k bits is positioned lower than the T-th bit (No at S104), the extraction unit 13 supplies the k bits to the fixed-length coding unit 142. The fixed-length coding unit 142 codes the k bits with fixed-length, and generates a second code string (S108).

The extraction unit 13 searches a bit position "n" of MSB of the transformation coefficient after extracting the k bits (S109). Briefly, the extraction unit 13 calculates (n−k) as a new "n". Then, processing is forwarded to S104.

At S104, if the bit position "n" of MSB of present transformation coefficient is "0" (No at S104), the output unit 15 outputs a code string (S110), and processing is completed.

Hereafter, as to coding processing of transformation coefficient "+156 (10011100, sign+)", the case that "N=7, T=4, k=2" is explained.

At a first order of S104, it is decided that "n=7>0". Accordingly, processing is transferred to S105. At S105, the extraction unit 13 extracts two bits "10" of 7-th bit and 6-th bit from bits of transformation coefficient "+156". At S106, it is decided that "n=7>T=4". Accordingly, processing is transferred to S107. At S109, the extraction unit 13 calculates "7−2" as a new "n(=5)".

At a second order of S104, it is decided that "n=5>0". Accordingly, processing is transferred to S105. At S105, the extraction unit 13 extracts two bits "01" of 5-th bit and 4-th bit from bits of transformation coefficient "+156". At S106, it is decided that "n=5>T=4". Accordingly, processing is transferred to S107. At S109, the extraction unit 13 calculates "5−2" as a new "n(=3)".

At a third order of S104, it is decided that "n=3>0". Accordingly, processing is transferred to S105. At S105, the extraction unit 13 extracts two bits "11" of 3rd bit and 2nd bit from bits of transformation coefficient "+156". At S106, it is decided that "n=3<T=4". Accordingly, processing is transferred to S108. At S109, the extraction unit 13 calculates "3−2" as a new "n(=1)".

At a fourth order of S104, it is decided that "n=1>0". Accordingly, processing is transferred to S105. At S105, the extraction unit 13 extracts two bits "00" of 1st bit and 0-th bit from bits of transformation coefficient "+156". At S106, it is decided that "n=1<T=4". Accordingly, processing is transferred to S108. At S109, the extraction unit 13 calculates "1−2" as a new "n(=−1)".

At a fifth order of S104, it is decided that "n=−1<0". Accordingly, processing is transferred to S110. As a result, a code string of the transformation coefficient "+156" is generated.

As above-mentioned, processing of the image coding apparatus 1 is already explained.

Moreover, when the output unit 15 outputs a code string to an image decoding apparatus 2 (explained afterwards), the output unit 15 may add information of a bit position "N" of MSB of the transformation coefficient to the code string, and generate the code string with the information to the image decoding apparatus 2. Alternatively, the bit position "N" may be set as a fixed value.

Furthermore, when the output unit 15 outputs a code string to the image decoding apparatus 2 (explained afterwards), the output unit 15 may add information of a predetermined bit position (T-th bit) to the code string, and generate the code string with the information to the image decoding apparatus 2.

In the first embodiment, a plurality of bits is collectively subjected to entropy coding. As a result, processing load can be reduced, and fall of scalability can be suppressed.

Furthermore, as to a plurality of bits positioned at higher-order side, by executing variable-length coding of which processing load is fewer than arithmetic coding, the processing load can be reduced while maintaining coding efficiency thereof. Briefly, bits positioned at MSB side have a large bias of occurrence frequency of each signal value. Accordingly, by using variable-length coding such as Huffman coding, the coding can be effectively performed. On the other hand, bits positioned at LSB side have a small bias of occurrence frequency of each signal value, and improvement of coding efficiency by entropy coding cannot be expected. Accordingly, fixed-length coding is used. As a result, the processing load can be further reduced.

Moreover, at S105, the number of bits "k" extracted once by the extraction unit 13 may not always constant. For example, if the transformation coefficient is represented as eight bits "0"~"7", three bits (k=3) may be extracted at a first order, three bits (k=3) may be extracted at a second order, and two bits (k=2) may be extracted at a third order. Briefly, the extraction unit 13 extracts the smaller number of bits at LSB side in comparison with MSB side. In this case, when the extraction unit 13 searches a bit position "n(=N)" of MSB of transformation coefficient at S103, the extraction unit 13 had better determine the number of bits "k" to be extracted at each order. As a result, the processing load can be suppressed while raising compression ratio thereof.

(Modification)

If the number of figures of effective bit is not a multiple of the number of bits (fixed value) to be extracted, the extraction unit 13 had better execute any of following processing.

Figure 4:
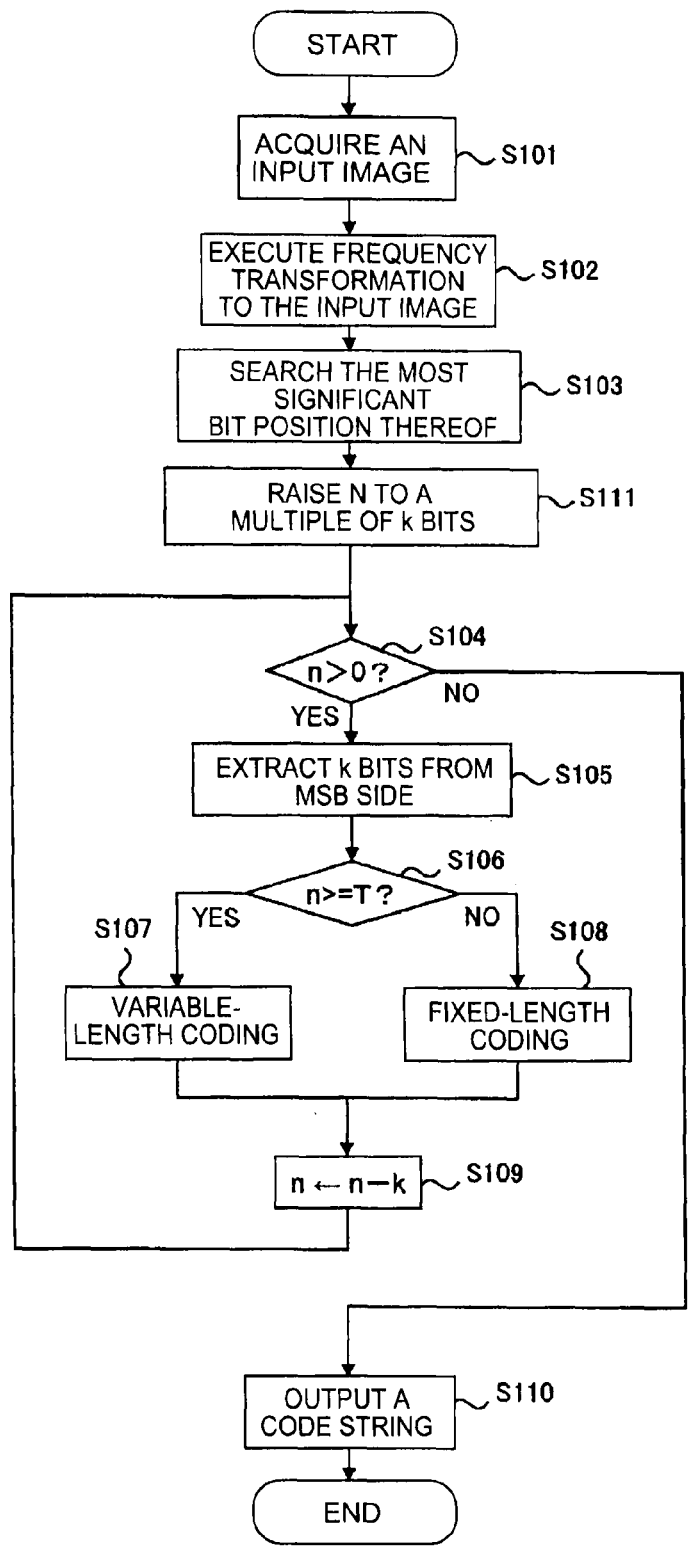
FIG. 4 is one example of transformation coefficients.

(1) FIG. 4 is a flow chart of processing of the image coding apparatus according to the modification. In this modification, S111 is added after S103. At S111, the extraction unit 13 raises a most significant bit to a unit so that the unit is equal to a multiple of the number of bits to be extracted (S111). Here, the extraction unit 13 sets a value of the raised figure to "0". For example, if the most significant bit is "6" and every two bits is extracted, the extraction unit 13 raises the most significant bit to a unit "7", and extracts every two bits "7~6", "5~4", "3~2" and "1~0".

(2) As mentioned-above, the extraction unit 13 changes the number of bits to be extracted in the middle of extraction processing. For example, if the most significant bit is "6", by increasing the number of bits to be extracted for high-order bit, the extraction unit 13 extracts in order of three bits, two bits and two bits, such as "6~4", "3~2" and "1~0". Alternatively, by decreasing the number of bits to be extracted for low-order bit, the extraction unit 13 extracts in order of two bits, two bits, two bits and one bit, such as "6~5", "4~3", "2~1" and "0".

Furthermore, as to variable-length coding and fixed-length coding, after a region where value of non-zero does not exist is excluded by zero-tree or quad-tree, this coding may be applied to another region including value of non-zero.

(The Second Embodiment)

As to an image decoding apparatus 2 according to the second embodiment, an image is generated by decoding an input code string. The image decoding apparatus 2 may generate an image by decoding a code string generated from the image coding apparatus 1.

Figure 5:
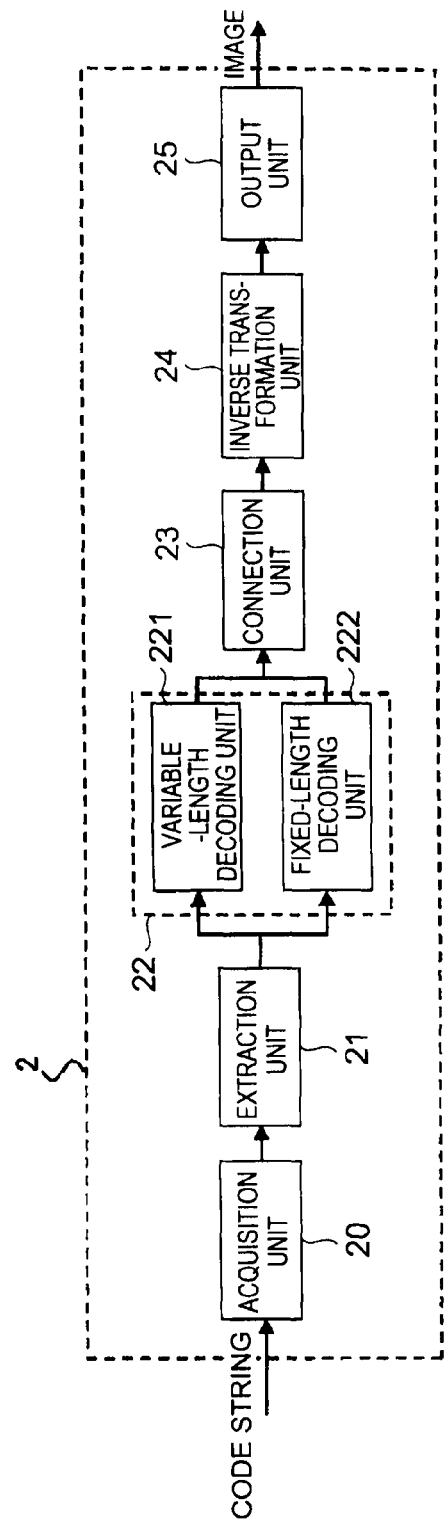
FIG. 5 is a block diagram of an image coding apparatus 2 according to the second embodiment.

FIG. 5 is a block diagram of the image decoding apparatus 2. The image decoding apparatus 2 includes an acquisition unit 20, an extraction unit 21, a decoding unit 22, a connection unit 23, an inverse transformation unit 24, and an output unit 25. The decoding unit 22 includes a variable-length decoding unit 221 and a fixed-length decoding unit 222.

The acquisition unit 20 acquires a code string. Moreover, the acquisition unit 20 had better preserve the code string into a storage unit (not shown in FIG).

As to the code string acquired, the extraction unit 21 extracts a plurality of bits in order from a bit corresponding to MSB of transformation coefficient, and supplies the plurality of bits to the decoding unit 22. Here, if the plurality of bits is positioned higher than a predetermined position (T-th bit), the extraction unit 21 supplies the plurality of bits to the variable-length decoding unit 221. If the plurality of bits is positioned lower than the predetermined position (T-th bit), the extraction unit 21 supplies the plurality of bits to the fixed-length decoding unit 221.

The variable-length decoding unit 221 decodes the plurality of bits with variable-length, and generates first data for the plurality of bits. The fixed-length coding unit 222 codes the plurality of bits with fixed-length, and generates second data for the plurality of bits.

The connection unit 23 connects the first data with the second data, and acquires a transformation coefficient. The inverse transformation unit 24 executes frequency-inverse transformation to the transformation coefficient, and generates an image. Here, the frequency-inverse transformation may be an inverse orthogonal transform such as inverse Discrete wavelet transform (IDWT) or inverse Discrete cosine transform (IDCT). Moreover, when a code string generated by the image coding apparatus 1 is decoded, the inverse transformation unit 24 had better perform inverse transformation of frequency-change by the transformation unit 12.

The output unit 25 outputs the image via a display (not shown in FIG) or a memory (not shown in FIG).

The acquisition unit 20, the extraction unit 21, the decoding unit 22, the connection unit 23, the inverse transformation unit 24 and the output unit 25, may be realized as a central processing unit (CPU) and a memory used thereby.

As mentioned-above, component of the image decoding apparatus 2 is already explained.

Figure 6:
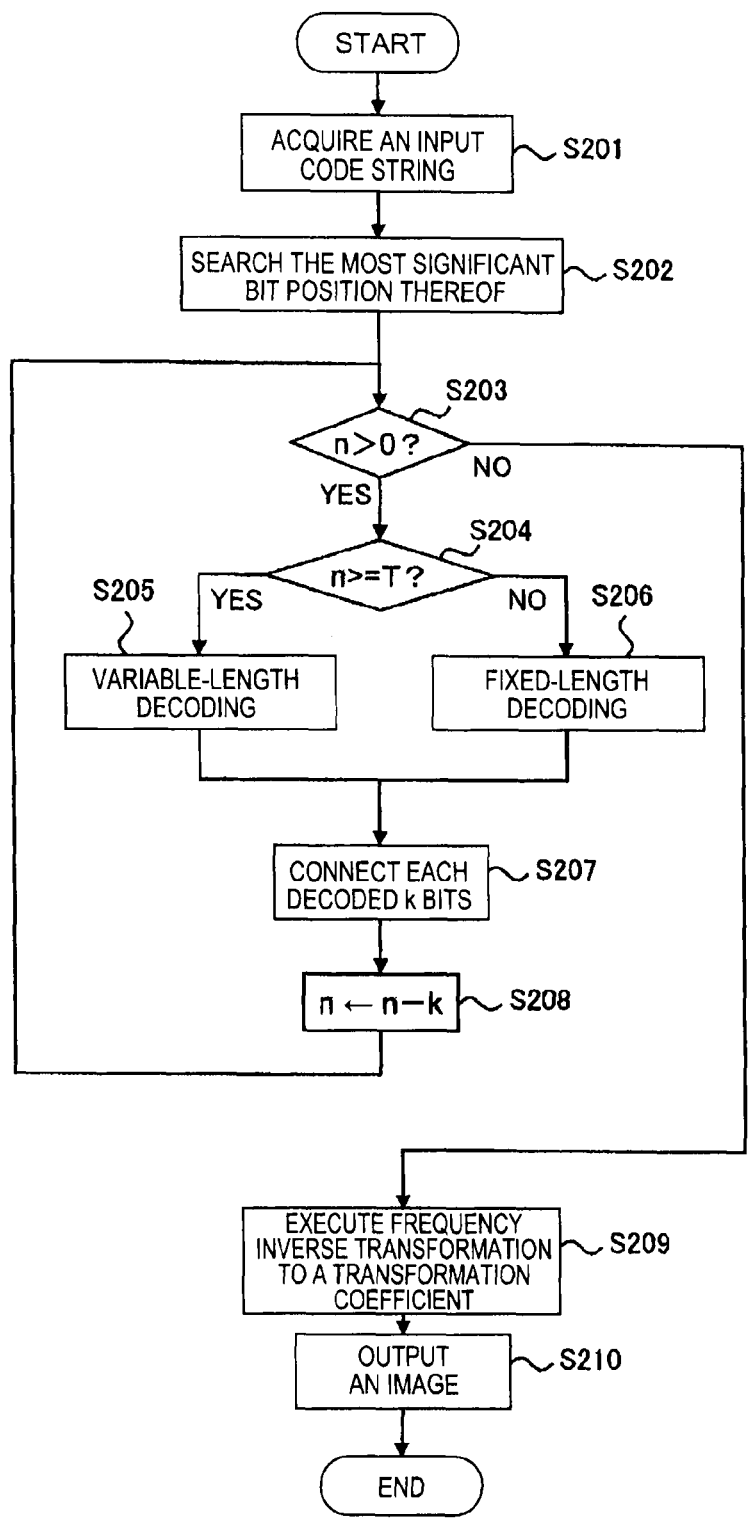
FIG. 6 is a flow chart of processing of the image coding apparatus 2.

FIG. 6 is a flow chart of processing of the image decoding apparatus 2. The acquisition unit 20 acquires a code string (S201). The extraction unit 21 searches a bit position "n" (Initially, n=N) of MSB of present transformation coefficient (S202). Information of bit position N of MSB may be added to the code string or a fixed value previously set.

The extraction unit 21 decides whether at least one bit is not decoded yet (S203). Briefly, the extraction unit 21 decides whether a bit position "n" of MSB of present code string is larger than "0".

If the bit position "n" is larger than "0" (Yes at S203), the extraction unit 21 decides whether a plurality of bits (k bits) to be decided is positioned higher than T-th bit (S204).

If k bits to be decoded is positioned higher than T-th bit (Yes at S204), the extraction unit 21 extracts the k bits, and supplies it to the variable-length decoding unit 221. The variable-length decoding unit 221 decodes the k bits with variable-length, and generates first data (S205). For example, the variable-length coding may be Huffman coding or run-length coding.

If k bits to be decoded is positioned lower than T-th bit (No at S204), the extraction unit 21 extracts the k bits, and supplies it to the fixed-length decoding unit 222. The fixed-length decoding unit 222 decodes the k bits with fixed-length, and generates second data (S206).

The connection unit 23 connects the first data and the second date, and acquires a transformation coefficient (S207). The extraction unit 21 searches a bit position "n" of MSB of the code string after decoding the k bits (S208). Briefly, the extraction unit 21 calculates (n−k) as a new "n". Then, processing is forwarded to S203.

At S203, if the bit position "n" of MSB of present code string is "0" (No at S203), the inverse transformation unit 24 executes frequency-inverse transformation to the transformation coefficient, and generates an image (S209). The output unit 25 outputs the image (S210), and processing is completed.

Moreover, the number of bits "k" to be extracted once by the extraction unit 21 may not be constant. Here, the output unit 15 of the image coding apparatus 1 may add information of k bits to a code string to be outputted in order. Alternatively, the information may be previously set thereto.

Furthermore, as to variable-length decoding and fixed-length decoding, after a region where value of non-zero does not exist is excluded by zero-tree or quad-tree, this decoding may be applied to another region including value of non-zero.

In the second embodiment, a plurality of bits is collectively subjected to entropy decoding. As a result, processing load can be reduced. Furthermore, as to a plurality of bits positioned at higher-order side, by executing variable-length decoding of which processing load is fewer than arithmetic decoding, the processing load can be reduced.

As mentioned-above, in the first and second embodiments, the coding and decoding can be effectively executed.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for coding an image, comprising:
   a transformation unit configured to acquire a transformation coefficient by executing frequency transformation to the image;
   an extraction unit configured to extract a plurality of bits from the transformation coefficient; and
   a coding unit configured to execute variable-length coding to the plurality of bits including a most significant bit, and to execute fixed-length coding to the plurality of bits including a least significant bit,
   wherein the coding unit executes variable-length coding to the plurality of bits when the plurality of bits is positioned higher than a predetermined bit position, and executes fixed-length coding to the plurality of bits when the plurality of bits is positioned lower than the predetermined bit position.

2. The apparatus according to claim 1,
   wherein the extraction unit raises a most significant bit of the transformation coefficient to a unit so that the unit is equal to a multiple of a size of the plurality of bits.

3. An apparatus for decoding an image, comprising:
   an extraction unit configured to extract a plurality of bits from a code string acquired;
   a decoding unit configured to execute variable-length decoding to the plurality of bits including a most significant bit, and to execute fixed-length decoding to the plurality of bits including a least significant bit;
   a connection unit configured to acquire a transformation coefficient by connecting the plurality of bits each decoded; and
   an inverse transformation unit configured to generate the image by executing frequency-inverse transformation to the transformation coefficient,
   wherein the decoding unit executes variable-length decoding to the plurality of bits when the plurality of bits is positioned higher than a predetermined bit position, and executes fixed-length decoding to the plurality of bits when the plurality of bits is positioned lower than the predetermined bit position.

4. A method for coding an image, comprising:
   acquiring a transformation coefficient by executing frequency transformation to the image;
   extracting a plurality of bits from the transformation coefficient;
   executing variable-length coding to the plurality of bits including a most significant bit; and
   executing fixed-length coding to the plurality of bits including a least significant bit,
   wherein said variable-length coding to the plurality of bits is executed when the plurality of bits is positioned higher than a predetermined bit position, and said fixed-length coding to the plurality of bits is executed when the plurality of bits is positioned lower than the predetermined bit position.

5. A method for decoding an image, comprising:
   extracting a plurality of bits from a code string;
   executing variable-length decoding to the plurality of bits including a most significant bit;
   executing fixed-length decoding to the plurality of bits including a least significant bit;
   acquiring a transformation coefficient by connecting the plurality of bits each decoded; and
   generating the image by executing frequency-inverse transformation to the transformation coefficient,
   wherein said variable-length decoding to the plurality of bits is executed when the plurality of bits is positioned higher than a predetermined bit position, and said fixed-length decoding to the plurality of bits is executed when the plurality of bits is positioned lower than the predetermined bit position.

6. A non-transitory computer readable medium for causing a computer to perform a method for coding an image, the method comprising:
   acquiring a transformation coefficient by executing frequency transformation to the image;
   extracting a plurality of bits from the transformation coefficient;
   executing variable-length coding to the plurality of bits including a most significant bit; and
   executing fixed-length coding to the plurality of bits including a least significant bit,
   wherein said variable-length coding to the plurality of bits is executed when the plurality of bits is positioned higher than a predetermined bit position, and said fixed-length coding to the plurality of bits is executed when the plurality of bits is positioned lower than the predetermined bit position.

7. A non-transitory computer readable medium for causing a computer to perform a method for decoding an image, the method comprising:
   extracting a plurality of bits from a code string;
   executing variable-length decoding to the plurality of bits including a most significant bit;
   executing fixed-length decoding to the plurality of bits including a least significant bit;
   acquiring a transformation coefficient by connecting the plurality of bits each decoded; and
   generating the image by executing frequency-inverse transformation to the transformation coefficient, wherein said variable-length decoding to the plurality of bits is executed when the plurality of bits is positioned higher than a predetermined bit position, and said fixed-length decoding to the plurality of bits is executed when the plurality of bits is positioned lower than the predetermined bit position.

\* \* \* \* \*